United States Patent [19]

Buhler et al.

[11] 3,758,757

[45] Sept. 11, 1973

[54] EXPONENTIAL PREDICTOR AND SAMPLED-DATA SYSTEMS

[75] Inventors: Otto R. Buhler; Joseph T. Cutter, both of Boulder, Colo.

[73] Assignee: International Business Machines Corporation, Armonk, N.Y.

[22] Filed: Mar. 8, 1972

[21] Appl. No.: 232,885

[52] U.S. Cl. ................ 235/150.1, 328/151, 318/636
[51] Int. Cl. ............................................ G05b 21/02
[58] Field of Search .................. 235/150.1; 318/636; 328/151

[56] References Cited

UNITED STATES PATENTS

| | | | |
|---|---|---|---|
| 3,230,351 | 11/1966 | Platt et al. | 235/151 |
| 3,051,938 | 8/1962 | Levy | 340/347 |
| 3,206,665 | 9/1965 | Burlingham | 318/312 |
| 3,469,515 | 9/1969 | Hillman | 95/125 |
| 3,665,168 | 5/1972 | Canfield | 235/150.1 X |

*Primary Examiner*—Eugene G. Botz
*Attorney*—Francis A. Sirr et al.

[57] ABSTRACT

A sampled variable or data is modified, between sample times, by a predictor whose exponentially decaying output is continuously available for use by an analog continuous-control output device. In a hybrid digital-analog closed-loop system, having a known time constant of response, a variable condition is sampled at times to derive a sampled-data signal at each sample time. This signal is applied to an R-C differentiating circuit having a time constant of the order of said known time constant. At each sample time, the capacitor charge is reduced to zero by momentary closing of a switch which shorts the capacitor.

25 Claims, 4 Drawing Figures

EXPONENTIAL PREDICTOR AND SAMPLED-DATA SYSTEMS

BACKGROUND AND SUMMARY OF THE INVENTION

The present invention is concerned with the general field of sampled-data systems, and more particularly with a predictor for modifying a sampled-data signal and thereby providing a modified sampled-data signal for use by a continuous-control system.

A system in which the data appears as a variable-characteristic output at spaced sampling times is known as a digital or sampled-data system, whereas a system in which the data appears as a continuous variable is known as an analog or continuous system.

In a sampled-data system, the behavior of the system between sample times is known to be an important factor in analyzing system performance. Networks, such as filters, have been provided to achieve a desired system response between sample times.

In a hybrid digital-analog system, the coupling member between the digital and analog portions of the system may, for example, be a digital-to-analog converter (DAC).

It is conventional in such a hybrid system to apply the analog output of the DAC to the input of a continuous controller. This connection may include proportional, integral, and differential networks to provide the well-known PID type control.

The present invention is directed to an exponential predictor for use in modifying a sampled-data signal prior to the signal being applied to an analog device. The essence of the present invention is the provision of a signal-modifying network which receives sampled-data at each sample time and provides a time-diminishing output between sample times, the time constant of the network being of the order of the system time constant from which the sampled-data is derived.

While the invention is not to be limited thereto, the invention finds particular utility where the time between samples is of the order of, or longer than, the time constant of the system for which the data is derived.

Specifically, the network of the present invention includes an R-C differentiating network. The time-diminishing output is effectively taken from the junction of the capacitor and the resistor. The charge on the capacitor is reset to substantially zero at each sample time. As a result, a voltage at the above-mentioned junction becomes equal to the sampled-data at each sample time and exponentially decays therefrom until the arrival at the next sample time.

More specifically, the charge on the capacitor is reset to zero by the momentary closing of a shunt switch at each sample time. In addition, the voltage magnitude of the sampled-data is known to have a nominal value when the system dependent variable is nominal. The reference potential for the R-C network, to which the resistor is connected, is selected to be substantially equal to this nominal value.

The foregoing and other features and advantages of the invention will be apparent from the following more particular description of preferred embodiments of the invention, as illustrated in the accompanying drawings.

DETAILED DESCRIPTION OF THE DRAWINGS

Figure 1:
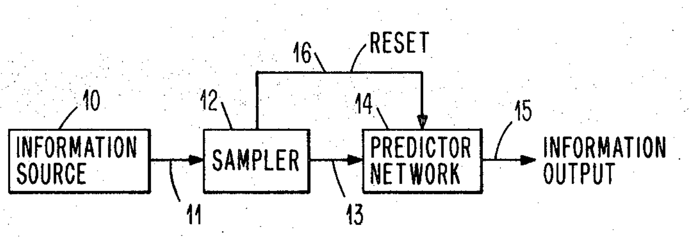
FIG. 1 is a block diagram showing of the present invention wherein sampled-data is derived from an analog information source and is modified by operation of the present invention.

The block diagram showing of FIG. 1 facilitates a basic understanding of the structure of the present invention. In this figure, information source 10, which may be a process having a known time constant, provides an analog or continuous independent variable on conductor 11, the signal on conductor 11 having a characteristic, such as magnitude, which is an analog or continuous function of a variable process condition. This analog signal is applied as an input to sampler 12. This sampler is effective to sample the analog signal on conductor 11 at periodic and/or aperiodic intervals and to thereby provide quantized sampled-data output at conductor 13. The output at conductor 13 may change in magnitude at each sample instant, depending upon the characteristic of the analog signal at conductor 11 at this instant. Between sample instances, the magnitude of the signal at conductor 13 reamins substantially constant, independent of the variation in the signal which may be occurring at conductor 11. Thus, the signal at conductor 13 is a steady-state signal between sampling instances or times and is step-variable to a different steady-state at a sampling time.

This sampled data signal, on conductor 13, is applied as input to predictor network 14, whose output at conductor 15 consists of an exponential decaying signal which exponentially decays from a magnitude established by the magnitude of the analog signal on conductor 11 at the sample time. Just prior to a sample time, the signal on conductor 15 will have a value related to the value of the analog signal at conductor 11 at the prior sample time by the time constant of predictor network 14. At the upcoming sample time, sampler 12 enables reset conductor 16 to reset predictor network 14 such that its output on conductor 15 instantaneously becomes equal to the state of the signal on conductor 13 at the instant of the sample time. Thus, while predictor 14 provides a known time-diminishing output on conductor 15, the magnitude of the signal on conductor 15 is reset to a state indicative of the signal on conductor 11 at each instant of sampling.

Figure 2:
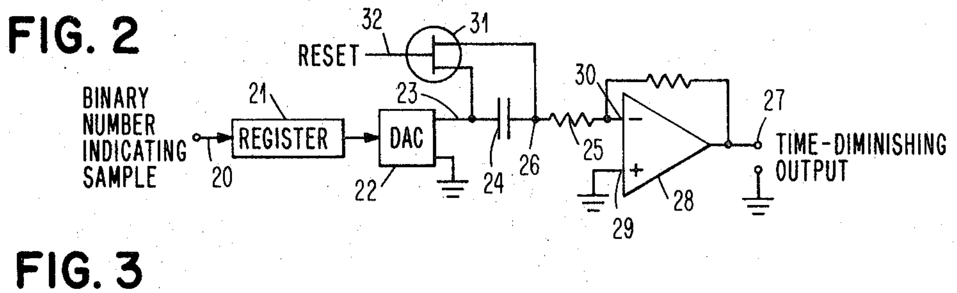
FIG. 2 is a schematic showing of one form which the predictor network of FIG. 1 may take.

While the essence of the present invention is broadly concerned with a structural arrangement for providing a signal modification such that a sampled-data input signal 13 is modified to provide a time-diminishing output 15 between sample times, the output being adjusted to be substantially equal to the sampled-data at the instant of a sample time, FIG. 2 discloses an embodiment of the present invention wherein the modification network consists of an R-C network. In FIG. 2, input conductor 20 receives sampled-data, at periodic and/or aperiodic intervals, in the form of a binary number whose magnitude indicates a characteristic of a condition, for example, an independent variable. This binary number is stored in register 21, this register being connected to the input of DAC 22. The analog output of DAC 22, on conductor 23, is referenced to ground potential. At each sample time, the potential level of output conductor 23 is adjusted and maintained at a steady-state value until the next sample time.

The above-mentioned R-C network may be a differentiating network including capacitor 24 and resistor 25. The junction 26 between the capacitor and the resistor is effectively connected to output terminal 27 by way of operational amplifier 28. Amplifier 28 has its non-inverting input terminal 29 connected to ground reference potential and the amplifier circuitry is constructed and arranged such that its inverting input terminal 30 is at virtural ground potential. The exponentially decaying (time-diminishing) output at terminal 27 is related to the voltage at terminal 26 by the gain of amplifier 28. Thus, terminal 26 and/or 27 can be considered to be the output terminal of the predictor network shown in FIG. 2.

The reset means of FIG. 2 consists, in part, of field effect transistor (FET) switch means 31 whose source-to-drain circuit is connected to directly shunt capacitor 24. FET 31 is normally nonconductive or open and is momentarily rendered conductive or closed as conductor 32 is rendered active at each sample time. When FET 31 is conductive, the charge on capacitor 24 is adjusted to reset the modifying network of the predictor. Specifically, the charge on capacitor 24 is reduced to zero.

As will be appreciated, when the voltage across capacitor 24 is reduced to zero, the voltage at terminal 26 is immediately adjusted to be equal to the output of DAC 22, that is, to be equal to the potential level of conductor 23. Thereafter, and until the next sample time, the voltage at terminal 26 exponentially decays as capacitor 24 charges. This time-diminishing potential level at terminal 26 is reproduced at terminal 27.

It is contemplated that the structure shown in FIG. 2 as an open loop structure may in fact be a portion of a closed-loop control apparatus associated with a process being controlled. In this case, the output at terminal 27 is a dependent variable which is utilized to control a portion of the process, this control resulting in modification of the independent variable sampled-data signal on conductor 20. A closed-loop system of this type has an inherent time constant of response. Within the teachings of this invention, the charging time constant of resistor 25 — capacitor 24 network is of the order of the time constant of response of the above-mentioned closed loop.

Figure 3:
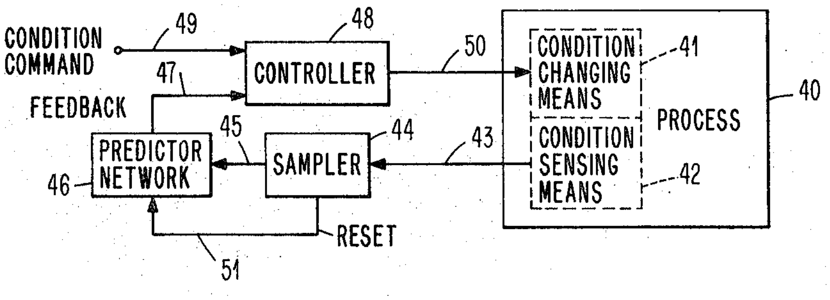
FIG. 3 is a showing of a closed-loop hybrid digital-analog system incorporating the present invention, wherein the sampled-data is derived from an analog process variable.

An exemplary showing of such a closed-loop system in accordance with the present invention is shown in FIG. 3. The structure shown therein provides for the derivation of sampled-data from a continuous process variable. Process 40 may be any of a variety of processes. For example, process 40 may represent an oven wherein a condition-changing means in the form of a heating/cooling structure maintains a desired set point temperature, the actual temperature of the oven being sensed by a condition sensing means 42, for example, in the form of a thermocouple structure which provides a continuous, analog, independent variable signal on conductor 43. This continuous signal is sampled, usually at a periodic interval, by sampler means 44, to in turn provide a sampled-data independent variable signal on conductor 45. This sampled-data signal, having a steady-state value between sampling times or instances, is modified by predictor network 46 to provide a time-diminishing output on conductor 47, this output constituting a feedback signal for continuous controller 48. Controller 48 also receives condition commands on conductor 49. By way of example, this command may be a command temperature for process 40. Controller 48 provides continuous analog control of condition changing means 41 by way of conductor 50.

The closed-loop structure of FIG. 3, including process 40, condition sensing means 42, controller 48, and condition changing means 41, has an inherent time constant of response which is a known characteristic of the system. Predictor network 46, which may for example take the form of the R-C and FET circuit of FIG. 2, is constructed and arranged to have a time constant, producing the required time-diminishing output, which is of the order of the time constant of response of the above-mentioned closed-loop structure.

Sampler 44 is effective, at each sample time, to reset predictor network 46 by way of reset conductor 51. When conductor 51 is rendered active, predictor network 46 is reset such that its instantaneous output 47 is related in a known manner (usually equal) to the predictor network input at conductor 45. Here again, reset conductor 51 may be reset conductor 32 of FIG. 2 which renders an FET conductive to reduce the voltage of the R-C capacitor to zero.

Figure 4:
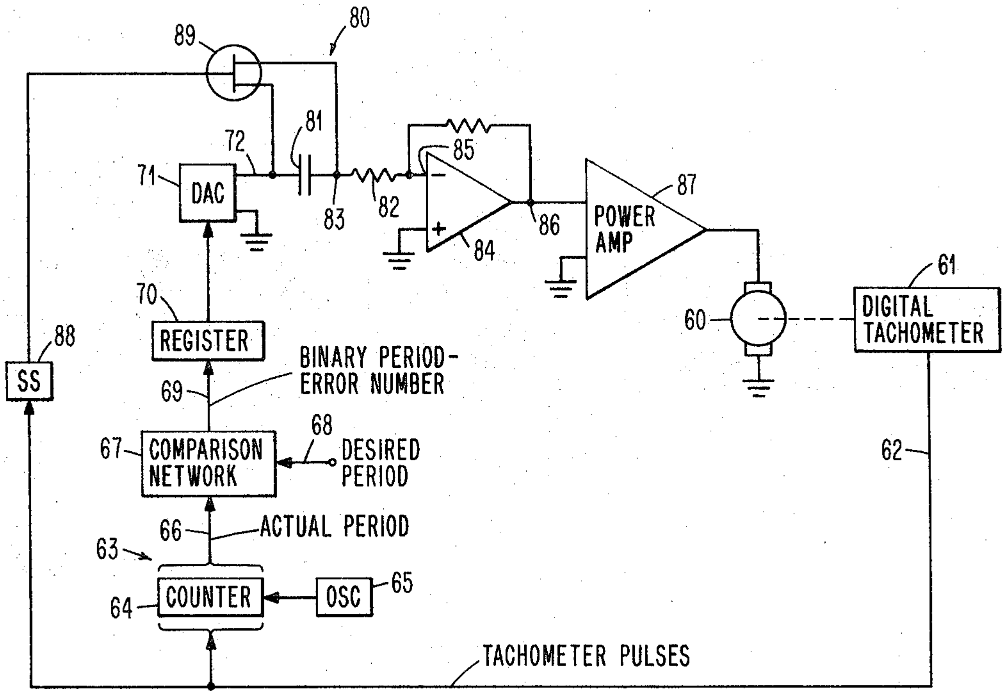
FIG. 4 is a showing of a closed-loop hybrid digital-analog motor speed servomechanism incorporating the present invention, wherein the process variable is derived from a discontinuous motor speed encoder, and a comparison of the actual motor period (speed) to the command motor period (speed) generates a sampled-data period (speed) error signal.

FIG. 4 is a schematic showing of a further embodiment of the present invention wherein the sampled-data signal is originated as a servo error signal, and wherein the process variable is derived from a condition sensing means in the form of a digital or discontinuous motor speed encoder such as a digital tachometer.

The function of the apparatus shown in this figure is to accelerate motor 60 from a rest condition to a desired or nominal steady-state speed and to thereafter maintain this motor speed. The process variable, namely motor speed, is sensed by digital tachometer 61. Tachometer 61 provides an output pulse on conductor 62 for each distance increment of movement of motor 60. The tachometer pulses on conductor 62 control a period measuring device 63. As is well known, period measuring device 63 includes a counter 64 which is driven by a high-frequency oscillator 65, whose frequency is much higher than the highest frequency to be expected on conductor 62.

Upon the occurrence of a tachometer pulse, counter 64 is reset to a reference count, usually zero, and oscillator 65 is thereafter effective to increase the count in counter 64. On the occurrence of the next tachometer pulse, signalling the end of a tachometer period, the count contained in counter 64 is provided at output conductor 66, and counter 64 is again reset to its reference count to again begin counting the next tachometer period. Comparison network 67 receives the actual period count on conductor 66 and compares this to a steady-state count on conductor 68, this steady-state count being referenced to the frequency of oscillator 65 and representing the desired period of motor 60 when the motor is running at the desired speed. As a result of this comparison, comparison network 67 provides a binary period-error or speed-error number on output conductor 69. This number is held in register 70 during the next period measuring interval then being counted by counter 64. During this interval, the binary number contained in register 70 controls DAC 71 and an analog signal on conductor 71 is maintained, the magnitude of this analog signal approximating the speed-error information.

The signal on conductor 72, which is of the sampled-data type, represents motor speed error and is utilized to control energization of motor 60 until the next tachometer pulse sample time. At the occurrence of the next sample time, the voltage on conductor 71 is adjusted in accordance with the number then transferred to register 70.

The sampled-data voltage on conductor 72 is modified by predictor network 80. This predictor network is similar to that disclosed in FIG. 2 and includes capacitor 81 and resistor 82 connected as a differentiator network having junction 83. Operational amplifier circuit 84 again is constructed and arranged to provide a virtual ground at inverting input terminal 85. The output voltage of amplifier 84, that is, terminal 86, is related to the voltage at terminal 83 by the gain of the amplifier network. The output voltage of amplifier 84 is effective to control power amplifier 87 and to thereby provide continuous energization of motor 60 in accordance with the magnitude of the voltage at terminal 86.

Each tachometer pulse on conductor 62 is also effective to fire single shot 88. Single shot 88, once fired, is maintained in its unstable condition for a relatively short time interval, as compared to the shortest interval between tachometer pulses on conductor 62. During the unstable operation of the single shot, FET 89 is rendered conductive and capacitor 81 is shorted, to thereby reduce its charge to substantially zero. In this manner, the voltage on terminal 86 is reset at each sampling time to be related to the output of DAC 71 by a constant factor, that is, the gain of amplifier 84. Thereafter, and until the occurrence of the next sample time, the voltage at terminal 86 decays with a time-diminishing or exponential characteristic.

The closed-loop system represented by motor 60, digital tachometer 61, period measuring means 63, comparison network 67, register 70, DAC 71, and power amplifier 87 exhibits a known time constant of response. Preferably, the time constant of charge modification for capacitor 81 is of the order of this time constant of response.

As will be appreciated, tachometer 61 provides aperiodic or variable period pulses while motor 60 is accelerating. Once motor 60 reaches its running speed, the period of the tachometer pulses becomes substantially periodic. The time constant of charge modification for capacitor 81 is preferably related to the time constant of the closed-loop system.

While the invention has been particularly shown and described with reference to preferred embodiments thereof, it will be understood by those skilled in the art that various changes in form and details may be made therein without departing from the spirit and scope of the invention.

What is claimed is:

1. In a control system wherein the magnitude of a variable process condition is sampled at intervals and a sampled-data signal is generated thereby, said sampled-data signal then being utilized to control condition-changing means which is effective to institute a change in the magnitude of said variable process condition, an improved means for anticipating the change in the process condition which is occurring between sample times, comprising:

a predictor network connected to receive said sampled-data signal as an input and having a time-diminishing output connected to said condition-changing means, the time constant of said network being of the order of the response time of said control system and the process being controlled thereby; and reset means connected to reset said network to the new sampled-data signal at each sample time.

2. A control system as defined in claim 1 wherein the time constant of said network provides a time-diminishing output having a decreasing value which approaches the expected value of the sampled-data signal at the next sample time.

3. A control system as defined in claim 2 wherein the time internal between said sampled-data signals is of the order of, or longer than, the response time of said control system.

4. A control system as defined in claim 3 wherein said predictor network includes an R-C differentiating network.

5. A control system as defined in claim 4 wherein said reset means includes switch means connected in parallel with said capacitor.

6. A control system as defined in claim 5 wherein closing of said switch means at each sample time discharges said capacitor and restores the output of said differentiating network to a magnitude related to the magnitude of said sampled-data signal existing at the sample time.

7. A control system as defined in claim 6 wherein said sampled-data signal is a variable analog signal.

8. In a closed-loop control apparatus for use in controlling the magnitude of a physical phenomena which is generated by a process, wherein said process includes phenomena-changing means controlled by said control apparatus; and wherein said control apparatus includes means for sensing the magnitude of said physical phenomena, the closed-loop represented by said control apparatus, said phenomena-changing means, said process and said means for sensing the magnitude of said physical phenomena having a known time constant of response; the improvement comprising:

a predictor network connected to receive as an input a sampled-data signal which is derived from said sensing means, said signal being representative of the magnitude of said physical phenomena at or during the time of sampling, said predictor network being constructed and arranged to provide a time-diminishing output whose instantaneous magnitude between sampling times is a prediction of the instantaneous magnitude of said physical phenomena and whose time-diminishing characteristic is of the order of said known time constant of response, and means operable at the time of sampling to reset said predictor network to a new signal representing the then existing magnitude of said physical phenomena.

9. A control apparatus as defined in claim 8 wherein said predictor network includes an R-C network whose capacitor charge is adjusted to be indicative of said physical phenomena at the time of each sampling.

10. A control apparatus as defined in claim 9 wherein said R-C network is a differentiator and wherein the charge on said capacitor is adjusted by switch means which is effective to momentarily close and thereby discharge said capacitor.

11. In combination, an information source having a nominal content, being variable from said nominal content and having a known time constant;

sampler means effective at times to sample the information content of said information source at times which are variable from an aperiodic to a periodic condition;

a predictor network having an input connected to said sampler means to receive the information content of said information source as an input signal at each of said sample times, said predictor network including modifier means having a time constant of the order of said known time constant and operating on said information content to produce a time-diminishing output approaching the nominal content of said information source; and reset means controlled by said sampler means and effective at each of said sample times to restore the output of said predictor network to the then existing information content of said information source.

12. The combination defined in claim 11 wherein the times of sampling are variable for a relatively long aperiodic condition to a shorter periodic condition, and wherein the time interval of said periodic condition is of the order of, or longer than, the response time of said control system.

13. The combination defined in claim 12 wherein said modifier means includes an R-C network, the voltage across the resistor thereof being adjusted in accordance with the value of said information content at each of said sample times.

14. The combination defined in claim 13 wherein said reset means is effective at each of said sample times to restore the charge of the capacitor thereof to substantially zero.

15. The combination defined in claim 14 wherein said reset means includes normally open switch means connected in parallel with said capacitor, and means effective at each of said sample times to momentarily close said switch means.

16. A hybrid digital-analog speed servomechanism for controlling the speed of a motor, comprising:

digital means, including means responsive to motor speed, to derive a digital signal indicative of motor speed-error at sample times;

a digital-to-analog converter having an input connected to receive said digital signal;

a predictor network having an input connected to the output of said digital-to-analog converter, said predictor network including analog-signal modifying means having an output whose magnitude reduces with time;

reset means controlled by means including said digital means and effective to control said modifying means at each sample time such that the output thereof is reset to the value of the output of said digital-to-analog converter at each sample time; and means connected to receive the output of said modifying means and effective to analog-control the energization of said motor.

17. A servomechanism as defined in claim 16 wherein the closed-loop defined by said servomechanism and said motor has a known time constant of response, and wherein said predictor network has a time constant of the order of said known time constant.

18. A servomechanism as defined in claim 17 wherein said modifying means is a differentiating network.

19. A servomechanism as defined in claim 18 wherein said differentiating network includes a resistor and a capacitor, with the output thereof being taken from the junction of said capacitor and said resistor.

20. A servomechanism as defined in claim 19 for controlling the speed of said motor at a nominal value, wherein the output of said signal modifying means has a known nominal value when the speed of said motor is equal to said nominal, wherein said resistor is connected to a potential representative of the nominal output of said digital-to-analog converter, that is, the output thereof when the speed of said motor is at said nominal value; and wherein said reset means is effective to reset the charge of said capacitor to zero at each sample time.

21. A servomechanism as defined in claim 20 wherein said means responsive to motor speed is a digital tachometer providing an output pulse for each distance unit of movement of said motor, and wherein said digital means includes means to compare the actual period output of said tachometer to a desired period indicative of said nominal motor speed.

22. A servomechanism as defined in claim 21 wherein said reset means includes normally open switch means connected in parallel with said capacitor, and means controlled by said tachometer to momentarily close said switch means upon the occurrence of each of said tachometer output pulses.

23. A servomechanism as defined in claim 22 wherein the output pulses of said tachometer occur at relatively long aperiodic intervals during acceleration of said motor, and occur at shorter periodic intervals when the speed of said motor is at nominal, and wherein the voltage at the junction of said capacitor and said resistor during said aperiodic operation decays to the nominal output of said digital-to-analog converter prior to the end of the aperiodic interval.

24. A servomechanism as defined in claim 23 wherein said periodic interval is of the order of, or longer than, said known time constant.

25. A servomechanism as defined in claim 24 wherein the time constant of said predictor network is such as to produce a voltage at the junction of said capacitor and said resistor during said periodic operation which approaches said nominal DAC output at the instant of occurrence of a tachometer output pulse.

* * * * *